United States Patent Office 3,213,535
Patented Oct. 26, 1965

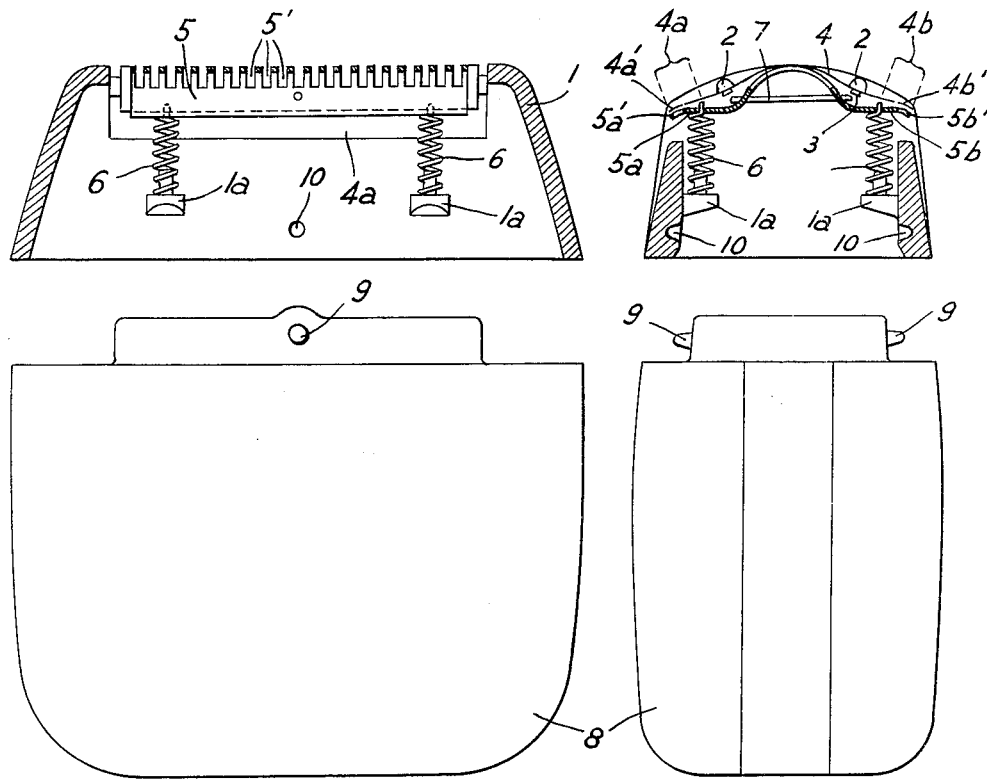

3,213,535
DRY SHAVER HEAD CONSTRUCTION FOR CUTTING LONG AND SHORT HAIR
Gerhard Heyek, Graz, Styria, Austria, assignor to Carinthia - Elektrogeräte Gesellschaft m.b.H., Klagenfurt, Carinthia, Austria
Filed May 21, 1962, Ser. No. 196,108
Claims priority, application Austria, May 31, 1961, A 4,271
1 Claim. (Cl. 30—34.1)

This invention is concerned with dry shavers including a reciprocating cutter which co-operates with a stationary blade to provide a shaving action and which also has cutting teeth along one edge which co-operate with teeth on the blade for the purpose of trimming.

According to the present invention a dry shaver has a flexible arched shearing blade formed with cutting teeth along one edge; a bridge part lying along the blade and supporting the blade close to the toothed edge; and a cutter which is urged against the blade and is formed by a sheet metal member of greater rigidity than the blade which has an arched portion engaging the blade and formed with openings to co-operate with the blade in providing a shaving action. A side portion of the cutter is joined to the arched portion by a portion curved in the opposite sense to the arched portion so that the side portion extends towards the blade from its junction with the curved joining portion, the free edge of the side portion being formed with cutting teeth which co-operate with the teeth on the blade to provide a trimming action during reciprocation of the cutter. The arched portion of the cutter is bridged by a cross-piece through which the reciprocating drive is applied to the cutter, the cross-piece being approximately at the centre of gravity of the cutter; the cross-piece may alternatively be even closer to the blade.

Shavers according to this invention are relatively easy to make as the reciprocating member, apart from the cross-piece, is in one piece. During manufacture the openings in the cutter teeth at the edge of the cutter may be produced in one operation. The openings may be in the form of slits, one edge of each bridge portion remaining between adjacent slits being bent outwards so as to form a flange, the edges of the flanges being ground so as to follow a cylindrical outline.

A shaver according to this invention operates effectively because, owing to the fact that the drive onto the cutter is approximately at the centre of gravity of the cutter (or even closer to the blade), there is no tendency for the cutter to tilt as force is applied to it by the driving means. Moreover, the cutter has a relatively low mass, and this facilitates the avoidance of disturbing resonance phenomena. The face of the cutter remote from the blade can be easily cleaned when necessary.

An example of a shaver according to this invention is shown in the accompanying diagrammatic drawings. In these drawings:

FIGURE 1 shows the shaver with the head lifted off and shown in section, as seen from the broad side of the shaver; and FIGURE 2 illustrates the shaver in the same way as seen from the narrow side; and FIGURE 3 is a perspective view with parts shown in section illustrating the shaver head.

In a head 1 of the shaver made, for example, of plastic, there are arranged along a top opening a pair of parallel bridge parts 2 secured at their ends to the head 1. Against the underside of these bridge parts a shearing blade 4 consisting of a thin arched metal plate rests in a manner such that it arches upwards between the two bridge parts being supported by them and projects laterally beyond them, the projecting edge strips 4a, 4b of the shearing blade carrying rows of cutting teeth 4a', 4b'. To hold the shearing blade on the bridge parts, the latter are provided, for example, with downwardly directed studs 3, engaging in corresponding apertures in the shearing blade 4.

A movable cutter 5 co-operating with the shearing blade 4 consists of a thicker, and therefore more rigid, sheet-metal part which is arched upwards in the middle, that is in the region located between the bridge parts 2. The curvature below the bridge parts changes into a curvature of opposite sense, so that side portions 5a, 5b of the cutter, which are in the shape of flat strips, project beyond the bridge parts and extend towards the blade from their junctions with the curved portions joining them to the arched portion. The free edges of the side portions 5a, 5b of the cutter are formed with cutting teeth 5a', 5b' which co-operate with the teeth 4a' and 4b' to provide a trimming action.

The cutter is urged against the shearing blade by four coil springs 6, whereby both the arched middle portion of the cutter and the toothed edges of the cutter bear resiliently against the blade with a consequent deformation of the blade. The springs 6 are supported by small brackets 1a, in the head 1 of the shaver.

For the engagement of a driving member (not shown in the drawings) with the cutter, which member is reciprocated by a motor, the central arch of the sheet metal part 5 is bridged by a cross-piece in the form of a pin 7 on which, for example, a driving member in the form of the forked end of an oscillating lever can act. This pin 7 is located at such a depth within the central arch of the sheet-metal part 5 that it is positioned either at the centre of gravity of the cutter or even closer than this to the blade 4, so that during the driving movement no tipping moment which would tend to swing the cutter about the axis of the pin is exerted on the cutter.

The problem solved by the present invention, i.e. to prevent tilting of the movable cutter, is particularly applicable with cutters of the kind described above inasmuch as with this construction there are at least two areas of engagement between portions of the movable cutter and of the shearing blade in different levels, as will be seen from FIGS. 1 and 2 of the drawing. The shear blade 4 engages the movable cutter 5 on its top portion at the level I and moreover, there are engagement areas between the toothed marginal portions 4a', 4b' and 5a', 5b' of the shearing blade 4 and of the cutter 5, respectively, at a level II. During the reciprocating movement of the cutter under the action of a force P, frictional reaction forces F (FIG. 1) will become effective at the levels I and II, these reaction forces having the same direction opposite to the direction of P. By arranging the cross-piece, to which the force P for the reciprocating drive is applied to the cutter, near the centre of gravity S of the curved movable cutter this centre of gravity as shown in FIG. 2 of the drawing is shifted into a level III lying intermediate the levels I and II, thus securing an approximate balance of the reaction forces created in the levels I and II as regards their tilting effect with respect to the centre of gravity S of the movable cutter.

The head 1 of the appliance can be connected detachably in a simple manner to a casing 8 of the shaver serving as a handle or grip and containing a driving motor (a vibratory motor). For example, the drawing shows a connection obtained by means of press buttons 9 on the casing 8 and corresponding locking recesses 10 in the head 1. It can be seen that, after the head 1 has been moved, the cutter is freely accessible for cleaning.

I claim:
A dry shaver having a head comprising a flexible arched shearing blade formed with cutting teeth along at least one edge; a bridge part secured to the cutting head and extending along the blade for supporting it close to the toothed edge; and a cutter spring biased against the blade thus supported and consisting of a sheet metal member of greater rigidity than the blade, said cutter having an arched portion engaging the blade at a first level and is formed with openings to co-operate with the blade to provide a shaving action, and at least one integral side portion adjacent the arched portion and being curved in a sense opposite to the arched portion so that the side portion extends towards the toothed edge of the blade, the free edge of the side portion being formed with cutting teeth which co-operate at a second level with the teeth on the edge of the blade to provide a trimming action during reciprocation of the cutter, and a cross-piece bridging the arched portion of the cutter and located at a third level intermediate the said first level of engagement of the cutter and the blade and the said second level of engagement of the teeth on the cutter and on the blade, the cross-piece serving to apply the reciprocating drive power to the cutter in said third level.

References Cited by the Examiner
UNITED STATES PATENTS

| | | | |
|---|---|---|---|
| 2,261,813 | 11/41 | Steinbach | 30—43 |
| 2,802,261 | 8/57 | Heyek | 30—43 |
| 2,870,534 | 1/59 | Angst et al. | 30—43 X |
| 2,975,516 | 3/61 | Heyek. | |
| 3,074,161 | 1/63 | Liska. | |

WILLIAM FELDMAN, *Primary Examiner.*

EDWARD V. BENHAM, *Examiner.*